United States Patent

Crow et al.

[11] 4,038,574
[45] July 26, 1977

[54] MOTOR LEAD GUIDE AND LEAD WIRE ATTACHING MEANS

[75] Inventors: William D. Crow; Thomas V. Ottersbach, both of St. Louis, Mo.

[73] Assignee: Emerson Electric Co., St. Louis, Mo.

[21] Appl. No.: 587,971

[22] Filed: June 18, 1975

[51] Int. Cl.² .......................................... H02K 11/00
[52] U.S. Cl. ................................................. 310/71
[58] Field of Search .................. 310/71, 41, 68, 68 A, 310/68 B, 68 E, 85, 66, 89, 91, 42, 272, 273, 260; 339/198, 198 BK; 336/192, 107; 200/6 A, 80

[56] References Cited

U.S. PATENT DOCUMENTS

| | | | |
|---|---|---|---|
| 2,590,058 | 3/1952 | Willits | 310/71 |
| 2,942,125 | 6/1960 | Schafer | 310/71 |
| 3,157,761 | 11/1964 | Seely | 200/80 |
| 3,157,762 | 11/1964 | Seely | 200/80 |
| 3,185,788 | 5/1965 | Zollman | 310/80 |
| 3,433,908 | 3/1969 | Cunningham | 200/80 |
| 3,482,128 | 12/1969 | Keck | 310/71 |
| 3,541,365 | 11/1970 | Willits | 310/71 |
| 3,691,415 | 9/1971 | Hancock | 310/68 E |
| 3,707,637 | 12/1972 | Charlton | 310/71 |
| 3,826,935 | 7/1974 | Grierson | 310/89 |

*Primary Examiner*—R. Skudy
*Attorney, Agent, or Firm*—Polster and Polster

[57] ABSTRACT

A dynamoelectric machine, for example, an electric motor, having an enclosure which includes a cylindrical shell and end shields on each end of the shell, the enclosure and end shield combination delimiting a chamber containing a stator assembly and a rotor assembly including a shaft rotatably supported along the end shields, and a terminal board mounted within the chamber adapted to permit the electrical interconnection of the dynamoelectric machine to a source of electrical energy along external leads inserted through an opening in the enclosure is provided with guide means for directing the external leads to the proper location, generally an outboard endshield facing side of the terminal board for connecting the external leads to the motor. Because of the guidance provided, the external leads do not foul on other structural elements of the motor and may be connected easily by field or original equipment manufacturing personnel at some point in time after motor manufacture. In the preferred embodiment, the guide means and terminal board are integrally constructed with one another and the guide means includes a generally rectangular, slanted ramp having a side wall formed about three sides of the ramp perimeter. The open side of the ramp is arranged so that it opens on the proper connection side of the associated terminal board. Means also are provided for holding internal electrical lead wires of the dynamoelectric machine in proper position on an inboard, chamber facing side of the terminal board.

9 Claims, 5 Drawing Figures

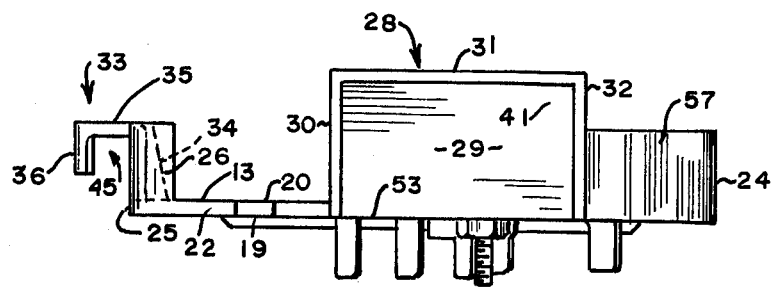
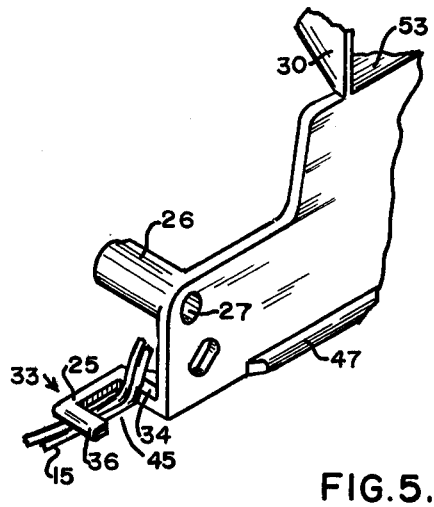
FIG. 3.
FIG. 5.

MOTOR LEAD GUIDE AND LEAD WIRE ATTACHING MEANS

BACKGROUND OF THE INVENTION

This invention relates to dynamoelectric machines, and in particular to a lead guide for interconnecting external leads to the dynamoelectric machine, exemplified by conventional induction motors, for example. While the invention is described with particular reference to an AC induction motor, those skilled in the art will recognize its wider applicability.

A large volume of electric motors are sold either to original equipment manufacturers or consumers without leads for connecting the motors to an external power source. In general, this type of motor includes an outer enclosure including a cylindrical shell having end shields mounted to opposite ends of the shell. The shell contains a stator assembly and a rotor assembly, the latter being mounted on a shaft which in turn is rotatably supported by the end shields. In general, one of the end shields is designed to permit access, either directly or after removal of a cover plate, to a terminal board mounted to the motor. An opening is provided in the shell and external leads, connected to a source of electrical energy, are inserted through the opening. The external leads thereafter are electrically and physically connected to the proper side of the terminal board. The purchaser of the motor is responsible for the connection of the external leads. As will be appreciated by those skilled in the art, the area through which the leads must be maneuvered is cluttered, as for example, by stator through bolts utilized to interconnect the end shields and the shell; by any centrifugal actuator which may be utilized in conjunction with a particular motor embodiment; by rotor fins utilized in conjunction with any particular rotor assembly design; by internal motor leads in motors prior to our invention; and by the winding end turns.

The invention disclosed hereinafter eliminates the possibility of interference between the external lead wires and any other motor components, and generally speeds electrical connection between the external lead wires and the terminal board of the motor. The particular motor embodiment illustrated also has a terminal board having a U-shaped, internal motor lead securing means associated with it. The securing means is used to engage the internal motor lead wires that extend between the motor windings and the terminal board, preventing the lead wires from interfering with any of the structural components of the motor illustratively described above.

One of the objects of this invention is to provide an improved terminal board structure having associated external lead guide and lead wire attaching means associated with it.

Another object of this invention is to provide a low-cost, simple to construct lead guide for a dynamoelectric machine.

Another object of this invention is to provide means for holding the internal lead wires of a motor winding in an unobtrusive manner.

Other objects of this invention will be apparent to those skilled in the art in light of the following description and accompanying drawings.

SUMMARY OF THE INVENTION

In accordance with this invention, generally stated, a terminal board mounted in a chamber defined by an enclosure of a dynamoelectric machine is provided with an associated lead guide structure for guiding external leads to the proper connection side of the terminal board. The preferred embodiment also has an internal motor winding lead wire securing means associated with it which prevents motor winding lead wire interference with other motor structure components, both during the construction of the dynamoelectric machine and its latter applicative operation.

BRIEF DESCRIPTION OF THE DRAWINGS

In the drawings,

FIG. 3 is a top plan view of the terminal board shown in FIG. 2;

FIG. 5 is a view in perspective, partly in section and partly broken away, illustrating the function of the winding lead attachment means of this invention.

DESCRIPTION OF THE PREFERRED EMBODIMENT

Figure 1:
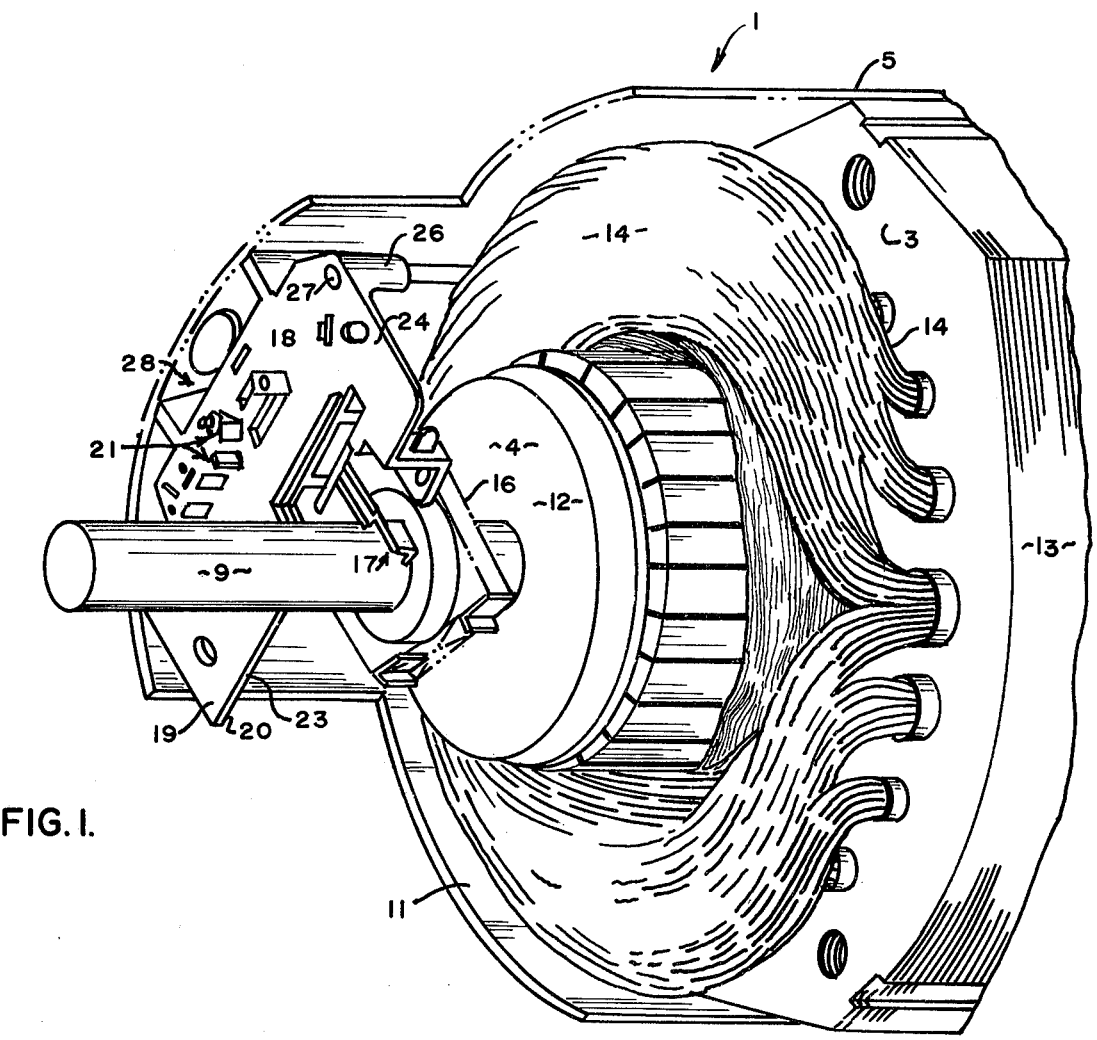
FIG. 1 is a view in perspective, partly broken away, of a dynamoelectric machine having one illustrative embodiment of guide means and winding lead attachment means of this invention associated with it.

Referring now to FIG. 1, reference numeral 1 indicates an electric motor which includes a stator assembly 3 and a rotor assembly 4 mounted within an enclosure 2, the enclosure 2 being shown in phantom lines for illustrative purposes.

Figure 4:
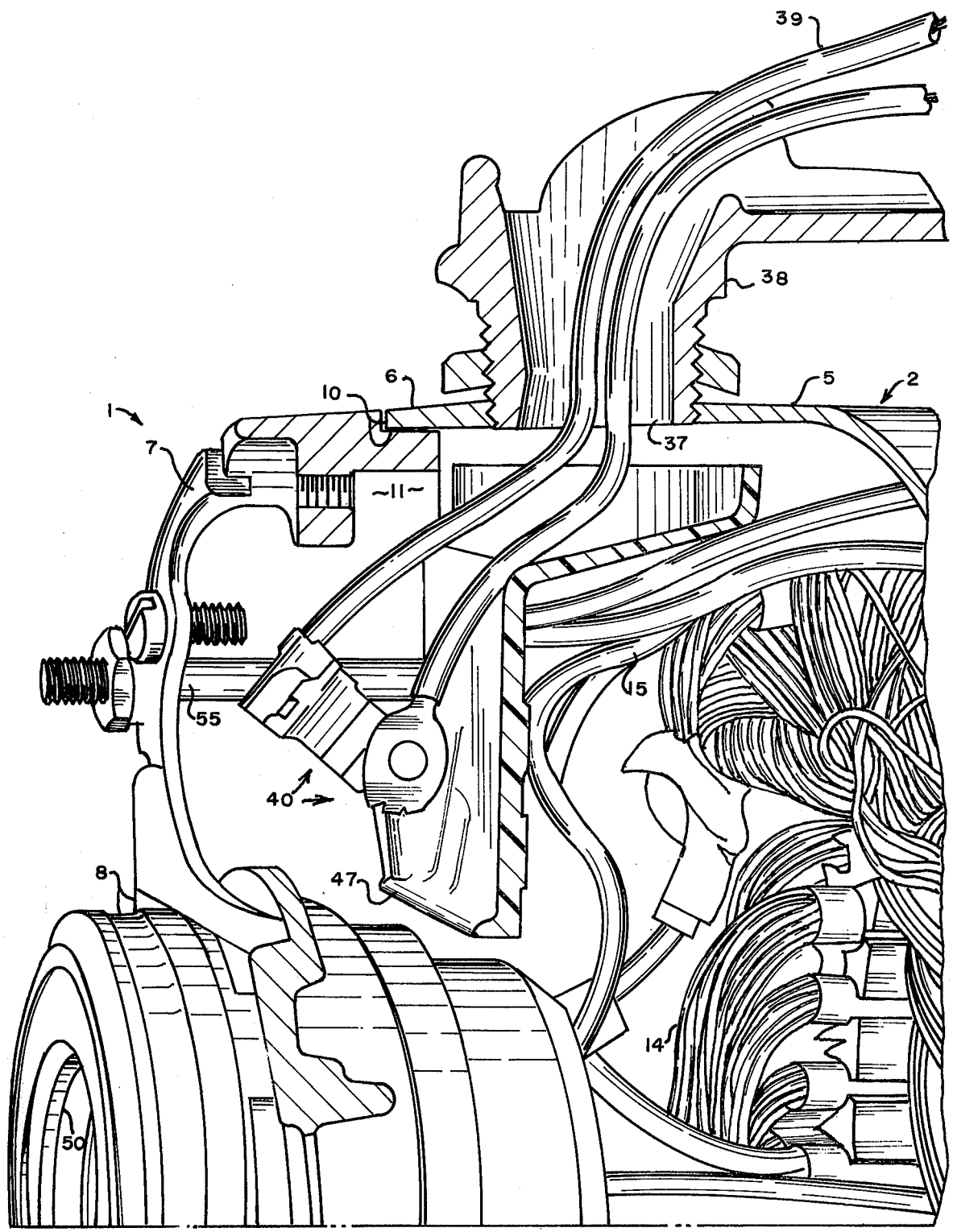
FIG. 4 is a view in perspective, partly in section and partly broken away, illustrating the function of the lead guide means of this invention, the rotor assembly of the dynamoelectric machine being eliminated for drawing simplicity.

The enclosure 2 generally is constructed from a cylindrical outer shell 5 which is at least partially closed by a pair of end shields 7, best seen in FIG. 4. The shell 5 has a first end 6 and a second end, not shown, and the end shields 7 are mounted to the shell 5 at the ends. The end shields are substantially similar, and only a single one of the end shields pair 7 is shown in the drawings. In general, each of the end shields 7 includes a central hub 8 housing a bearing means, indicated generally by the numeral 50. The bearing means 50 rotatably supports a shaft 9. The shaft 9 extends through the end shield pair 7 on at least one end of the enclosure 2. The end shields are connected to the shell 5 by any convenient method. For example, the end shields 7 may be provided with an annular lip 10 for receiving the respective ends of the shell 5. The particular motor embodiment shown in the drawings also utilizes a plurality of conventional threaded fasteners 55 inserted through corresponding openings in the stator assembly 4 and the end shield pair 7, permitting the interconnection of the end shield, shell, and stator assembly into a solid structural unit. Other interconnection techniques are compatible with the broader aspects of our invention. The enclosure 2 defines a chamber 11 which conventionally contains both the stator assembly 3 and the rotor assembly 4.

Rotor assembly 4 is conventional and may comprise a variety of designs. Generally, the rotor assembly 4 includes a rotor 12 constructed from a stack of individual laminations formed from suitable magnetic material. In single phase induction motors, it is common to utilize squirrel cage rotor designs having cast aluminum rotor bars and end rings. The rotor 12 has a central opening through it. The shaft 9 is inserted through the central rotor opening and the rotor and shaft are interconnected by any convenient method. Interconnection may be accomplished by a tight, press fit, for example.

The stator assembly 4 includes a core 13 constructed from a stack of individual laminations formed from magnetic material. Each lamination conventionally has a central opening and a plurality of radially extending, winding receiving slots communicating with the central opening. When individual laminations of the stack are aligned, the central opening defines a rotor receiving bore and the slots define axially extending, winding receiving receptacles. The slot defining receptacles have a motor winding 14 placed in them by any convenient method. The winding 14 conventionally includes a plurality of wire turns arranged in coils which are placed in the slots by any convenient method. Axial insertion machines of the type described in patent to Hill, U.S. Pat. No. 3,324,536, work well, for example. Suitable insulation for insulating the windings from the core commonly is provided. The winding 14 is electrically connected to a plurality of motor leads 15. The leads 15 are utilized to supply electrically energy to the winding 14 from any suitable power source.

It also is conventional, in many single phase induction motor designs, to employ a centrifugal actuator 16 during motor start-up. That is to say, coils of the winding 14 are arranged so that they define a main or run winding and an auxilary or start winding for the motor. Various motor designs are adapted to employ the start winding during the motor start-up period only. The actuator 16 is utilized to connect and disconnect the start winding from the power source whenever the rotor speed reaches or falls below some predetermined speed. Actuator 16 conventionally is movable between at least a first position and second position in response to motor speed. The actuator 16 is operatively connected to a switch assembly 17 which in turn is operatively connected to a terminal board 18. The terminal board 18 is used to connect the motor leads 15 to a source of electrical energy through a plurality of external leads 39 and the switch assembly 17. As the actuator 16 moves between its first and second positions, it operates the switch assembly 17 so as to connect or disconnect the motor start winding from the electrical energy source.

Figure 2:
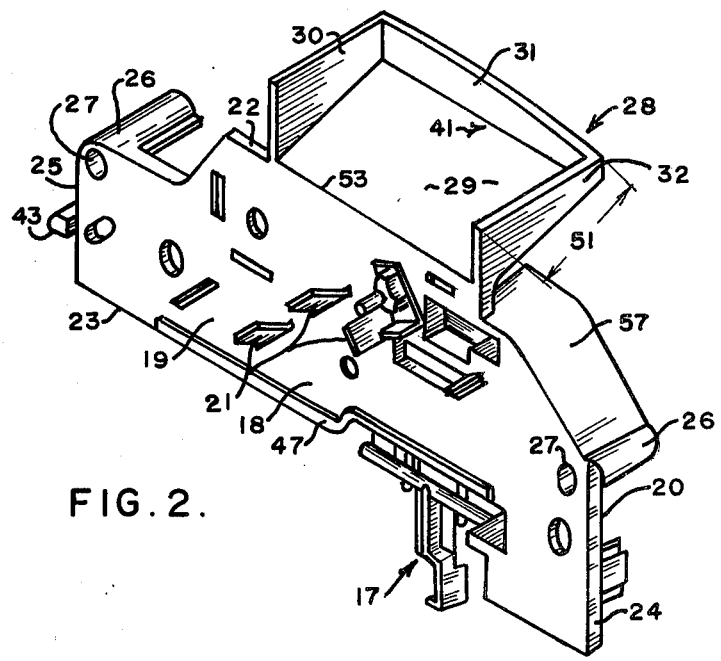
FIG. 2 is a view in perspective of the terminal board having guide means and winding lead attachment means utilized in conjunction with the dynamoelectric machine of FIG. 1.

The terminal board 18, best seen in FIG. 2, includes a first side 19 and a second side 20. The terminal board 18 has a plurality of electrical terminals 21 operatively connected between the sides 19 and 20. During the construction of the motor 1, the motor leads 15 are attached to the side 20 of the terminal board 18.

The terminal board 18 may comprise a variety of structures. Our invention is particularly well adaptable for use with the terminal board shown in the drawings. As there illustrated, the terminal board 18 has a top edge 22, a bottom edge 23, a first side edge 24, and a second side edge 25. The edges 24 and 25 have cylindrical housings 26 integrally formed with them. Each of the housings 26 have an axial opening 27 through it. The openings 27 are intended to receive respective ones of the fasteners 55 for mounting the terminal board 18 within the chamber 11. The fasteners 55 sometimes are known in the art as "through bolts" for the obvious reason that they extend through the entire motor 1 structure. A strengthening rib 57 is integrally formed with the terminal board 18, between the edge 24 and the top 22. The rib 57 projects outwardly from the side 20 of the terminal board 18. A strengthening rib 47 also is formed on and projects outwardly from the side 19 of the terminal board 18. The ribs 57 and 47 add structural rigidity to the terminal board, and other locations for the ribs or thier elimination in whole or in part may occur in other terminal board designs compatible with our invention. Preferably, terminal board 18 is constructed from a suitable plastic material. Details of the terminal board 18 and its associated switch 17 assembly, not described herein, may be obtained in a co-pending U.S. application, Crow et al., Ser. No. 587,822, filed June 18, 1975.

A guide means 28 is integrally formed along the top edge 22 of the terminal board 18. The guide means 28 extends outwardly from the plane of the terminal board 18 so that the combined structure has a depth dimension indicated by the numeral 51 in FIG. 2. Guide means 28 includes a ramp 29 canted with respect to an axis perpendicular to the plane of the sides 19 and 20 of the terminal board 18. Consequently, the ramp 29 has an elevated end 41 and a low end 53, again referenced to FIG. 2. In the particular embodiment illustrated, the guide means 28 is rectangular in top plan view, and the ramp 29 forms the bottom wall of the guide means. Ramp 29 is surrounded on three sides of its perimeter by a plurality of continuous walls 30, 31, and 32, respectively, the low end 53 of the canted ramp 29 being the open edge.

Terminal board 18 also has a winding lead attachment means 33 integrally formed along the side edge 25 of the terminal board. Lead attachment means 33, best seen in FIGS. 3 and 5, is U-shaped in plane, and includes a first leg 34, a connector portion 35, and a second leg 36. Leg 36, in the embodiment illustrated, is shorter than the leg 34, the leg 34 being attached to the edge 25 of terminal board 18.

Use of terminal boards incorporating our guide means 28 and attachment means 33 substantially eases both the manufacturing process in constructing motor 1, and later field interconnection of the motor 1 to a source of electrical energy. It may be observed, in FIGS. 1 and 4, that chamber 11 on the end 6 of the shell 5 generally is crowded with structural components of the motor 1. Thus, the actuator 12, the terminal board 18, switch assembly 17, the rotor assembly 4, the fasteners 10, and the plurality of motor leads 15, for example, all occupy some portion of the chamber 11. Manufacture of the motor 1 in the past has been hindered because the motor leads 15 often catch on one or more of these components. Interference of the motor leads 15 with the actuator 16 or the rotor assembly 4 is particularly bothersome, as this interference often is not detected until the construction of the motor is complete and the motor is subjected to a starting test. Such interference usually occurs with the rotor, preventing the motor from starting during test. With the lead attachment means 33 of our invention, the leads 15 are inserted in an open mouth 45 of the attachment means 33 and are drawn along the side 20 of the terminal board 18. The leads 15 are frictionally engaged between the legs 34 and 36, effectively holding the leads 15 in their proper position, both during any remaining manufacturing steps, and during motor operation in application use.

The shell 2 conventionally has an opening 37 in it, which is designed to receive a fitting 38. Fitting 38 is conventional and is not described in detail. Various forms of the fitting 38 are available commercially. Commonly, the electrical leads 39 are inserted through the fitting 38 to the chamber 11 so that the leads may be attached to the side 19 of the terminal board 18. The leads 39 conventionally have suitable end determinations generally indicated by the numeral 40, generally known in the art as quick connect terminals. Again, in prior art motor designs, the lead wires were inserted through the fitting 38 and maneuvered through the structural components contained in the chamber 11. Because of the crowded condition of this area, the simple task of connecting the motor 1 to a source of power proved to be arduous and time consuming. With the guide means 28 of our invention, insertion of the leads 39 through the fitting 38 and opening 37 causes the terminated ends 40 of the leads to strike the guide means 28. The guide means 28 structure necessarily directs the leads toward the side 19 of terminal board 18. Because of the direction provided, the leads may be attached easily to the terminal board 18. Consequently, the interconnection of the motor 1 to a source of electrical energy is facilitated by our invention.

Numerous variations, within the scope of the appended claims, will be apparent to those skilled in the art in light of the foregoing description and accompanying drawings. Thus, the design of the guide means 28 may vary in other embodiments of our invention. For example, the slope of the ramp and the attachment means 33 and its dimensions may be varied. While the guide means 28 are shown as being integrally formed with the terminal board 18, it is apparent that they may be constructed separately and later positioned properly within the chamber 11. Although the guide means 28 location is somewhat restricted to a location that enables it to direct the leads from a suitable opening in the stator enclosure to an associated terminal board, the location of the attachment means 33 may be altered considerably in other embodiments of this invention. Preferably, both the guide means 28 and the attachment means 33 are utilized in conjunction with one another. However, one may be used without reference to the other, if desired. While particular materials were described as preferred for constructing various components of our invention, other materials may be employed. These variations are merely illustrative.

Having thus described the invention, what is claimed and desired to be secured by Letters Patent is:

1. In an electric motor having a shell, end shields at opposite ends of said shell, said shell and end shields defining a chamber, said shell having an opening in it communicating with said chamber, said opening adapted to receive external lead wires for connecting said motor to a source of electrical energy, a stator assembly mounted in said chamber, said stator assembly including a winding having motor lead wires attached thereto, a shaft, said shaft being rotatably supported along said end shields, a rotor assembly mounted to said shaft and rotatable therewith, and a terminal board mounted to said motor, said terminal board being adapted to interconnect the external lead wires to various ones of said motor lead wires, the improvement which comprises means for guiding the external lead wires inserted through said opening in said shell from said opening to said terminal board, said guide means including a first wall defining ramp means extending between an area near said opening and said terminal board for directing said external lead wires to a connection area of said terminal board, said first wall having a rectangular shape in plan, said first wall further being offset with respect to a horizontal axis, and three side walls positioned along the perimetrical edges of said first wall.

2. The improvement of claim 1 further characterized by lead attachment means integrally formed with said terminal board, said lead attachment means including a U-shaped member having an open mouth for receiving and holding said motor lead wires in a predetermined position.

3. The improvement of claim 2 wherein said guide means is integrally formed with said terminal board.

4. In a dynamoelectric machine having an enclosure, a terminal board mounted within said enclosure, said terminal board having a first side and a second side, lead wires connected through said enclosure to said terminal board for supplying electrical energy to said dynamoelectric machine, and means for connecting said dynamoelectric machine to said terminal board, the improvement which comprises means for guiding said lead wires within said enclosure, said lead guiding means including a ramp structure adapted to direct said lead wires toward said terminal board, said ramp structure including a first wall offset with respect to an axis perpendicular to a plane defined by at least one side of said terminal board, said first wall having a rectangular silhouette in plan, and three side walls extending upwardly from said first wall, said side walls being positioned along three edges of said first wall.

5. The improvement of claim 4 wherein the bottom wall of said guide means is rectangular in plan, said bottom wall being offset with respect to an axis generally perpendicular to a plane defined by said terminal board so as to define an upper end and a lower end, the perimeter of said bottom wall having side walls extending upwardly therefrom along three perimetrical edges of said bottom wall.

6. The improvement of claim 4 wherein said means for connecting said dynamoelectric machine to said terminal board comprises motor lead wires, further characterized by lead attachment means integrally formed with said terminal board, said lead attachment means including a U-shaped member having an open mouth for receiving said motor lead wires.

7. The improvement of claim 6 wherein said lead guiding means is integrally formed with said terminal board.

8. In an electric motor having a shell, end shields at opposite ends of said shell, said shell and end shields defining a chamber therebetween, said shell having an opening in it communicating with said chamber, said opening adapted to receive external lead wires for connecting said motor to a source of electrical energy, a stator assembly mounted in said chamber, said stator assembly including a winding having insulated motor lead wires attached thereto, a shaft, said shaft being rotatably supported along said end shields, a rotor assembly mounted to said shaft and rotatable therewith, and a terminal board mounted to said motor, the improvement which comprises motor lead attachment means integrally formed with said terminal board, said motor lead attachment means including a U-shaped member having first and second legs and an open mouth between said legs for receiving said motor lead wires, said motor lead wires being frictionally engaged by the legs of said U-shape member, said motor lead attachment means engaging said motor leads so as to maintain proper motor lead position during operation of said electric motor, and means for guiding the external lead wires from the opening in said shell to said terminal board, said guide means comprising a bottom wall defining a ramp, said ramp extending between the opening in said shell and said terminal board, and at least one side wall positioned about the perimeter of said bottom wall.

9. In a dynamoelectric machine having an enclosure, a stator assembly mounted in said enclosure, a rotor assembly mounted in said enclosure, a shaft attached to said rotor assembly and extending outwardly therefrom along a longitudinal axis of said dynamoelectric machine, a terminal board mounted to said dynamoelectric machine, lead wires connected through said enclosure to said terminal board for supplying electrical energy to said dynamoelectric machine, and means for connecting at least the stator assembly to said terminal board, the improvement which comprises means for guiding said lead wires within said enclosure, said lead wire guiding means including a ramp structure extending from said terminal board and positioned to direct said lead wires toward said terminal board, said ramp structure including a first wall positioned to direct said lead wires axially along said ramp structure, and at least one side wall extending outwardly from said first wall and positioned with respect to said first wall so as to prevent movement of said lead wires except along said first wall.

* * * * *